INVENTOR.
AKIRA OKAYA
BY Richard H. Smith
AGENT

United States Patent Office 3,274,512
Patented Sept. 20, 1966

3,274,512
RESONATOR FOR RADIATION GENERATED BY STIMULATED EMISSION
Akira Okaya, Rockville, Md., assignor to International Business Machines Corporation, New York, N.Y., a corporation of New York
Filed Mar. 6, 1963, Ser. No. 263,329
8 Claims. (Cl. 331—94.5)

This invention relates to a resonator useful in the generation of coherent, collimated radiation. More particularly, this invention relates to a resonator for improving the collimation of a laser output beam.

The phenomenon known as stimulated emission of radiation has recently been applied as a means for amplifying and generating electromagnetic radiation in the microwave, infra-red and optical frequency ranges. The principle of operation of an optical maser (laser) is discussed in "Optical Masers," Scientific American, vol. 204, No. 6, June, 1961. As therein noted, an element essential to the successful production of the high energy output beam characteristic of an optical maser is the resonator.

The most common form of resonator presently used in optical masers in the Fabry-Perot (parallel-plate) resonator. This type of resonator comprises a pair of parallel, plane reflectors, one of which is constructed so as to transmit a small percentage of the light incident upon it. An "active medium" such as ruby (aluminum oxide containing a small amount of chromium) is placed between these reflectors. When pumping energy is applied to the ruby, stimulated emission of radiation is induced therein. During this process photons of radiation are emitted in many different directions, but those emitted in the axial direction (perpendicular to the plane reflectors of the resonator) are reflected back and forth through the active medium a great number of times, inducing the emission of many more similarly directed photons. For this reason radiation of the axial mode is the predominate product of an optical maser employing a parallel-plate resonator. The output beam (that radiation passing through the partially transmissive reflector) thus generated tends to be highly collimated and, thus, extremely directional. Production of a collimated output beam is a principal advantage of the parallel-plate resonator.

Some off-axial radiation, however, is generated in the parallel-plate resonator. Photons emitted in a direction only slightly deviating from the axial direction may oscillate a large number of times within the active medium before finally leaving the system. This off-axial radiation depletes the population of excited atoms within the active medium, detracting from the production of axial radiation, and causes divergence of the output beam. The placing of a converging lens system in the path of the radiation oscillating within the resonator has been suggested for the purpose of eliminating or at least reducing off-axial modes of radiation. The purpose of the converging lens system is to cause the axial radiation oscillating within the resonator to pass through a focal point during its travel between the reflecting plates of the resonator. A thin mask or diaphragm with a tiny hole in it is located in the focal plane of the lens system with the hole at the focal point. The hole is made only a few times larger than the wavelength of the radiation being generated so that the only radiation which passes through the hole is axial radiation. Off-axial modes of radiation do not pass through the focal point and thus are eliminated from the system when they strike the diaphragm and are absorbed.

This system of off-axial mode elimination is limited in its application to low power systems. This is so because there is a tremendous concentration of radiant energy at the focal point of the lens system, resulting in the destruction of the diaphragm in the area about the small hole. Solutions to this problem reside in keeping the power output of the laser low or increasing the size of the hole. Neither alternative is very satisfactory since the former restricts practical application of the laser, and the latter compromises its ability to eliminate off-axial modes of radiation.

It is, therefore, an object of the present invention to provide an improved resonator for devices which generate radiation by stimulated emission.

Another object is to provide a resonator which enhances the production by stimulated emission of a single, selected directional mode of radiation.

A further object is to provide a resonator for enhancing the production of a single directional mode of radiation in an optical maser without passing the radiation through a focal point.

Still another object is to provide an apparatus for modulating the intensity of a selected directional mode of radiation generated within an optical maser.

In accordance with the present invention there is provided a resonator for use in producing radiation by stimulated emission, which resonator employs a convex reflector in combination with matching refraction means for preserving the direction of radiation which is incident to the reflector along a line normal to its surface and which distorts the direction of radiation which is incident to the reflector along a line not normal to its surface.

The foregoing and other objects, features and advantages of the invention will be apparent from the following more particular description of preferred embodiments of the invention, as illustrated in the accompanying drawings.

Figure 1:
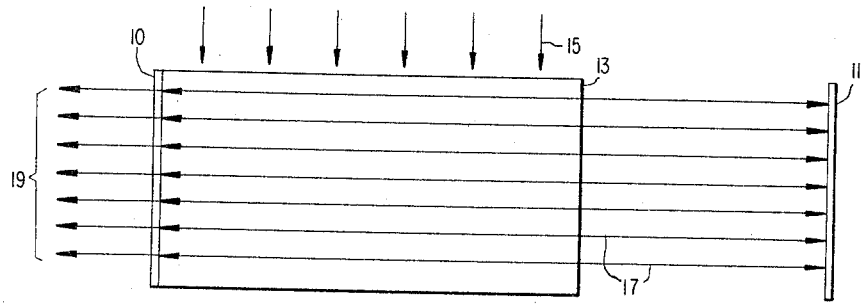
FIG. 1 is a schematic diagram illustrating the operation of a parallel-plate resonator with an optical maser.

With reference to FIG. 1, a generalized description of the operation of the common parallel-plate type of resonator will be given. A pair of plane reflection surfaces 10 and 11 are mounted in precise parallel alignment with each another. An active medium 13, such as ruby, is positioned in the space between the mirrors 10 and 11. When pumping energy such as radiation 15 from a high powered flash lamp (not shown) is applied to the active medium, stimulated emission of radiation is induced therein. Photons of radiation which are emitted in a direction parallel to the axis of the system (a line perpendicular to the plane mirrors 10 and 11), such as along the lines 17, are reflected a great number of times by the mirrors 10 and 11 back and forth through the active medium 13. Each time a photon of axial radiation traverses the active medium it collides with excited atoms and induces the emission therefrom of additional photons of axial radiation. Thus it can be seen that the predominate directional mode of radiation enhanced by a parallel-plate resonator is the axial mode. If a small percentage of the radiation incident upon the mirror 10 is transmitted through, rather than reflected from, the mirror, a highly collimated output beam 19 will emerge.

Figure 2:
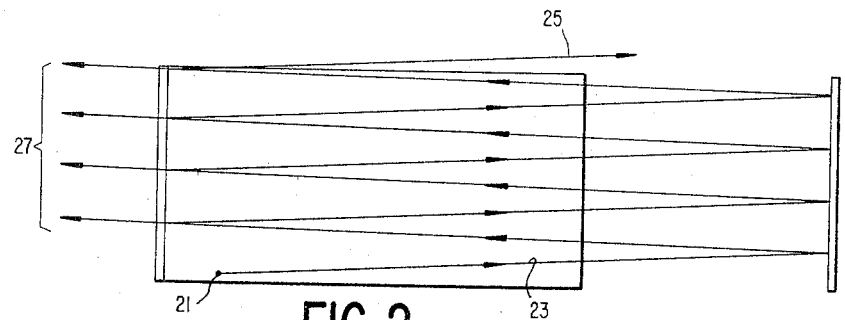
FIG. 2 is a schematic diagram illustrating the development of off-axial radiation in the resonator of FIG. 1.

However, as shown in FIG. 2, a photon emitted at the point 21 within the active medium and traveling in a slightly off-axial direction (exaggerated in the drawing)

such as the line 23, passes through the active medium a large number of times before leaving the system along the line 25. The cumulative effect of such slightly off-axial emission is the production of an off-axial mode of radiation 27 in the output beam. This off-axial radiation is undesirable first because it causes divergence (beam spread) of the output beam and second because in traveling through the active medium it collides with and thus "uses up" excited atoms which may well have been used for the production of axial radiation. This reduces the intensity of axial radiation in the output beam.

Figure 3:
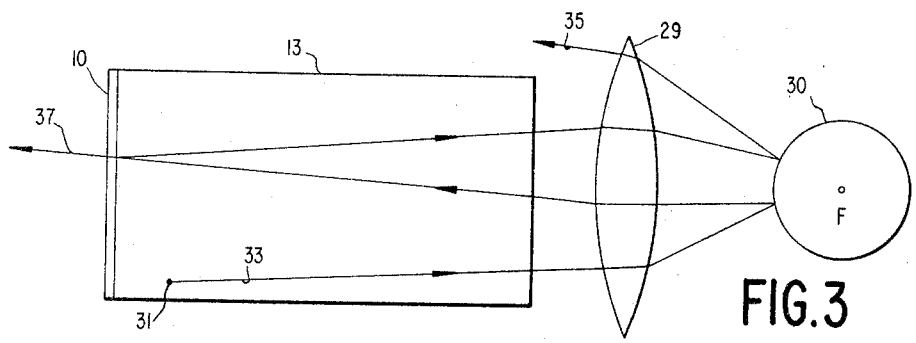
FIG. 3 is a schematic diagram illustrating the development of off-axial radiation in one embodiment of the present invention.

FIG. 3 shows a preferred embodiment of the present invention and illustrates the manner in which it minimizes the production of off-axial radiation. The plane mirror 11 of FIG. 1 has been replaced by a converging lens 29 and a spherical reflector 30. The spherical reflector is centered at the focal point F of the lens. As indicated, a photon of slightly off-axial radiation emitted at the point 31 and traveling in the direction of line 33 is, after being refracted by the lens 29, reflected from the spherical surface of the mirror 30 at a greater angle than that angle which would have resulted had the radiation simply been reflected by a plane surface, as in FIG. 2. By thus widening the angle at which off-axial radiation is reflected at one of the two reflecting surfaces of the resonator, such radiation is passed through the active medium only a small number of times before being rejected from the system at 35.

By thus reducing the number of passes which can be made by off-axial radiation through the active medium, there is less off-axial radiation present in the output beam and a larger percentage of the population of excited atoms in the active medium is used for production of axial radiation. This results in a more intense, more highly collimated output beam.

Figure 4:
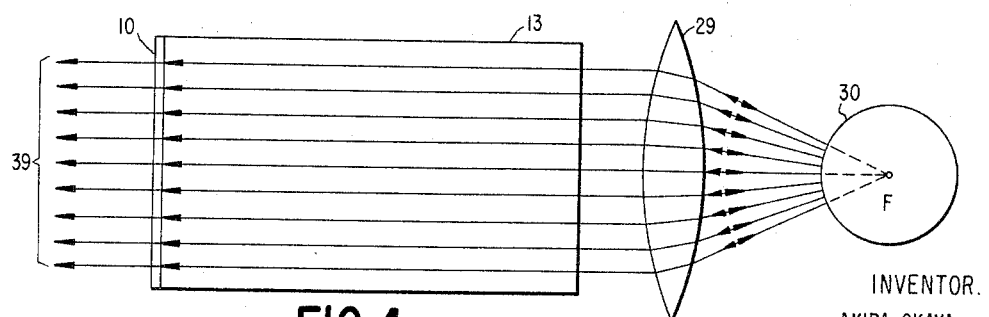
FIG. 4 is a schematic diagram illustrating the development of axial radiation in the embodiment of FIG. 3.

FIG. 4 illustrates the manner in which the axial mode of radiation is developed within the resonator of the present invention. The axis of converging lens 29 is parallel to a line perpendicular to the plane, partially transmissive mirror 10. Since the spherical mirror 30 is centered at the focal point of the lens, axial radiation is refracted by the lens 29 so that it is incident to the mirror 30 in a direction normal to the surface of the mirror. Thus, axial radiation is reflected by the mirror 30 along a path coincident to its path of incidence. This permits a build-up of the axial mode similar to that effected by the parallel-plate resonator of FIG. 1.

In practice, good results are produced by a one-quarter-inch diameter laser rod used in combination with a converging lens having a focal length of 1.26 inches and a reflecting sphere having a diameter of .437 inch. The sphere may be made of heat-conditioned glass having a 5 micron per inch surface finish and coated with a layer of nickel chromium of from 10 to 20 A. thickness and a layer of silver of approximately 15,000 A. thickness.

It is, of course, to be understood that the above enumerated elements may be altered in size and composition in order to conform to the requirements of different laser systems. Generally, the best results are obtained with lenses of small focal length and spherical reflectors of small radius.

Figure 5:
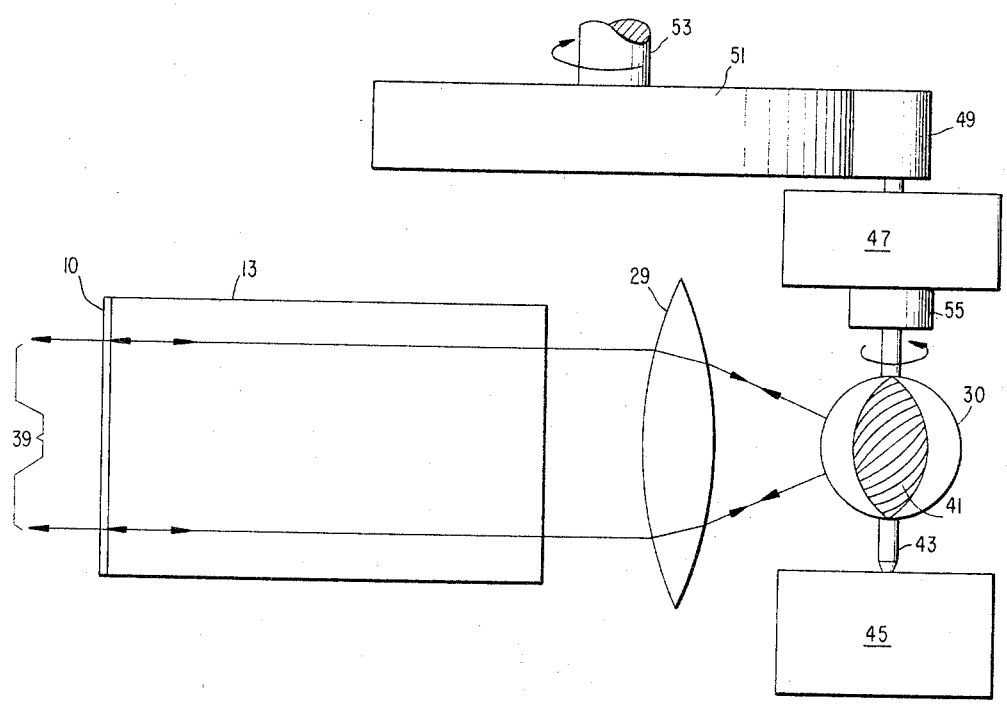
FIG. 5 is a schematic diagram illustrating a modification of the embodiment of FIGS. 3 and 4.

FIG. 5 illustrates a modification of the embodiment shown in FIGS. 3 and 4. The purpose of this modified embodiment is to provide means for modulating the intensity of the output beam 39. The basic resonator is the same as that shown in connection with FIGS. 3 and 4 and comprises the partially transmissive plane mirror 10, active medium 13, converging lens 29 and reflecting sphere 30. However, instead of the entire surface of the sphere 30 being reflective, a portion 41 thereof is made nonreflective. Further, the sphere is axially mounted on a shaft 43, which, in turn, is rotatably mounted in a bearing block 45 and a journal block 47. A roller 49 of small diameter is fixed to the upper end of the shaft 43 and makes contact with a roller 51 of large diameter mounted on a drive shaft 53. A collar 55 is connected to the shaft 43 just below journal block 47 to prevent the shaft from lifting out of its seat in bearing block 45.

As the drive roller 51 is rotated in the direction shown, driven roller 49 causes the shaft 43 and thus the reflecting sphere 30 to rotate in the opposite direction. Because of the high drive ratio indicated by the relative diameters of the rollers 51 and 49, the reflector 30 may be spun at a high angular velocity. As this occurs, the nonreflective portion 41 of the sphere 30 periodically interrupts the reflection of radiation back into the active medium 13, temporarily impeding the buildup of radiation of the axial mode within the resonator. During this period of nonreflection the intensity of the output beam 39 is reduced, or the beam cut off altogether, depending upon how nonreflective the portion 41 is and how fast the sphere 30 is rotated. When the sphere is rotated at a constant velocity the output beam 39 is intensity-modulated in a constant cycle. If, however, the angular velocity of the sphere is varied in an intelligent pattern, the output beam 39 can be made to transmit information.

It is to be understood that the mechanical apparatus shown in FIG. 5 for rotating the reflective sphere 30 constitutes only one embodiment of this feature of the present invention. A magnetic suspension and rotation system could be substituted therefor. Still other schemes of rotation could be used with equal facility.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a device for enhancing the production of selected directional modes of radiation generated by stimulated emission, the combination comprising:

means for inducing stimulated emission of radiation, including a source of pumping energy and an active medium emitting radiation by stimulation when acted upon by pumping energy from said source;

refraction means located in the path of radiation emitted from said active medium for diverting a selected directional mode of said emitted radiation along a converging path to a fixed focal location on the side of said refraction means away from said active medium; and convex reflection means interposed between said refraction means and said focal location for reflecting radiation of said selected mode back to said refraction means along a diverging path coincident to said converging path, thereby directing said radiation of said selected mode back into said active medium along a path coincident to its path of emission.

2. In a device for enhancing the production of selected directional modes of radiation generated by stimulated emission, the combination comprising:

means for inducing stimulated emission of radiation, including a source of pumping energy and an active medium emitting radiation by stimulation when acted upon by pumping energy from said source;

refraction means located in the path of radiation emitted from said active medium for diverting a selected directional mode of said emitted radiation along a converging path to a fixed point located on the side of said refraction means away from said active medium; and convex reflection means interposed between said refraction means and said point of convergence for reflecting radiation of said selected mode back to said refraction means along a diverging path coincident to said converging path, thereby directing said radiation of said selected mode back into said active medium along a path coincident to its path of emission.

3. In a device for enhancing the production of selected directional modes of optical radiation generated by stimulated emission, the combination comprising:

means for inducing stimulated emission of optical radiation, including a source of pumping energy and an active medium emitting optical radiation by stimulation when acted upon by pumping energy from said source;
a converging lens located in the path of radiation emitted from said active medium for diverting a selected directional mode of said emitted optical radiation along a converging path to a fixed point located on the side of said lens away from said active medium; and
a spherical convex reflection surface interposed between said lens and said point of convergence with its center at said point for reflecting radiation of said selected mode back to said lens along a diverging path coincident to said converging path, thereby directing said radiation of said selected mode back into said active medium along a path coincident to its path of emission.

4. In a device for enhancing the production of selected directional modes of optical radiation generated by stimulated emission, the combination comprising:
means for inducing stimulated emission of optical radiation, including a source of pumping energy and an active medium oriented about a fixed axis emitting, by stimulation, optical radiation both parallel and non-parallel to said axis when acted upon by pumping energy from said source;
a converging lens located in the path of radiation emitted from said active medium and having its axis coincident to said fixed axis for focusing said emitted axially parallel radiation to a fixed focal point located on the side of said lens away from said active medium and on the axis of said lens; and
a spherical convex reflection surface interposed between said lens and said focal point with its center at said focal point for reflecting said emitted radiation back toward said lens, whereby said emitted axially parallel radiation is reflected back into said active medium along a path coincident to its path of emission and said nonparallel radiation is reflected along a path more nonparallel than its path of emission.

5. In a device for enhancing the production of selected directional modes of radiation generated by stimulated emission, the combination comprising:
means for inducing stimulated emission of radiation, including a source of pumping energy and an active medium oriented about a fixed axis emitting, by stimulation, radiation both parallel and non-parallel to said axis when acted upon by pumping energy from said source;
plane reflection means located on said axis to reflect emitted axially parallel radiation back into said active medium along a path parallel to said axis;
refraction means mounted on an opposite side of said active medium from said plane reflection means and located in the path of radiation emitted from said active medium for diverting a selected directional mode of said emitted radiation along a converging path to a fixed focal location on the side of said refraction means away from said active medium; and
convex reflection means interposed between said refraction means and said focal location for reflecting radiation of said selected mode back to said refraction means along a diverging path coincident to said converging path, whereby radiation of said selected mode is reflected back and forth through said active medium, between said plane reflection means and said convex reflection means, in a fixed, closed path.

6. In a device for enhancing the production of selected directional modes of optical radiation generated by stimulated emission, the combination comprising;
means for inducing stimulated emission of optical radiation, including a source of pumping energy and an active medium oriented about a fixed axis emitting, by stimulation, radiation both parallel and nonparallel to said fixed axis when acted upon by pumping energy from said source;
a plane reflection surface located normal to said axis for reflecting emitted axially parallel radiation back into said active medium along a path parallel to said axis;
a converging lens mounted on an opposite side of said active medium from said plane reflection surface with its axis coincident to the axis of said active medium for focussing emitted axially parallel radiation to a fixed focal point located on the side of said lens away from said active medium and on the axis of said lens; and
a spherical convex reflection surface interposed between said lens and said focal point with its center at said focal point for reflecting said emitted radiation back toward said lens, whereby said emitted axially parallel radiation is reflected back and forth through said active medium, between said plane reflection surface and said spherical convex reflection surface, in a fixed, closed path, the portion of said path located within said active medium being parallel to the axis of said medium.

7. In a device for alternately enhancing and impeding the production of selected directional modes of radiation generated by stimulated emission, the combination comprising:
means for inducing stimulated emission of radiation, including a source of pumping energy and an active medium emitting radiation by stimulation when acted upon by pumping energy from said source;
refraction means located in the path of radiation emitted from said active medium for diverting a selected directional mode of said emitted radiation along a converging path to a fixed focal location on the side of said refraction means away from said active medium;
convex reflection means interposed between said refraction means and said focal location for reflecting radiation of said selected mode back to said refraction means along a diverging path coincident to said converging path, thereby directing said radiation of said selected mode back into said active medium along a path coincident to its path of emission; and
means for alternately destroying and restoring the reflective properties of said reflection means so as to alternately absorb and reflect said radiation, the periods of reflection acting to increasing within said active medium the amount of radiation emitted in said selected direction, and the periods of absorption acting to decrease the amount of radiation emitted in said selected direction.

8. In a device for alternately enhancing and impeding the production of selected directional modes of radiation generated by stimulated emission, the combination comprising:
means for inducing stimulated emission of radiation, including a source of pumping energy and an active medium emitting radiation by stimulation when acted upon by pumping energy from said source;
refraction means located in the path of radiation emitted from said active medium for diverting a selected directional mode of said emitted radiation along a converging path to a fixed point located on the side of said refraction means away from said active medium;
a spherical convex surface interposed between said refraction means and said point of convergence, said surface being reflective over a first portion and nonreflective over a second portion for reflecting radiation of said selected mode back to said refraction means along a diverging path coincident to said converging path, thereby directing said radiation of said selected mode back into said active medium along a path coincident to its path of emission; and
means for rotating said spherical surface so that said radiation of said selected mode is incident alternately upon said reflective and said nonreflective portions of said surface, thereby alternately enhancing and impeding the production within said active medium of said selected mode of radiation.

References Cited by the Examiner

FOREIGN PATENTS 680,167  10/1952  Great Britain.

OTHER REFERENCES

Baker et al.: "Mode Selection and Enhancement with a Ruby Laser," Applied Optics, vol. 1, No. 5, September 1962, page 674.

Collins et al.: "Control of Population Inversion in Pulsed Optical Masers by Feedback Modulation," Journal of Applied Physics, vol. 33, No. 6, June, 1962, pages 2009–2011.

Electronics, "Undersea Coherant Light," (no author listed) vol. 36, No. 8, Feb. 22, 1963, page 30.

Gurs: "Das Schwinguengsverhalten von optischen Rubin-Masern mit grossem Spiegelabstand," Z. Naturforschung, vol. 17A, November 1962, pages 990–993.

Skinner et al.: "Diffraction-Limited Ruby Oscillator," Journal of O.S.A., vol. 52, November, 1962, page 1319.

JEWELL H. PEDERSEN, *Primary Examiner.*

RONALD L. WIBERT, *Examiner.*

E. S. BAUER, *Assistant Examiner.*